(12) United States Patent
Yi et al.

(10) Patent No.: US 7,536,193 B2
(45) Date of Patent: May 19, 2009

(54) APPARATUS AND METHOD FOR CONTROLLING ACCESS TO NETWORK IN WIRELESS COMMUNICATION SYSTEM

(75) Inventors: Seung June Yi, Seoul (KR); Young Dae Lee, Hanam-si (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/841,599

(22) Filed: Aug. 20, 2007

(65) Prior Publication Data

US 2007/0283025 A1   Dec. 6, 2007

Related U.S. Application Data

(63) Continuation of application No. 10/817,493, filed on Apr. 2, 2004, now Pat. No. 7,299,062.

(30) Foreign Application Priority Data

Apr. 3, 2003   (KR) ............................... 2003-21143

(51) Int. Cl.
*H04B 7/00* (2006.01)

(52) U.S. Cl. ............... 455/511; 455/522; 455/67.13; 370/338

(58) Field of Classification Search ............ 455/511, 455/522, 67.11, 67.13, 550.1, 466, 521; 370/321, 370/333
See application file for complete search history.

(56) References Cited

U.S. PATENT DOCUMENTS 6,456,826 B1   9/2002   Toskata et al.

FOREIGN PATENT DOCUMENTS

| JP | 8213961 | 8/1996 |
|---|---|---|
| JP | 2001044927 | 2/2001 |
| JP | 2001308784 | 11/2001 |
| JP | 2002064598 | 2/2002 |
| JP | 2002-218531 | 8/2002 |
| JP | 2002237775 | 8/2002 |
| JP | 2002-281152 | 9/2002 |
| JP | 2003051782 | 2/2003 |
| KR | 10-2003-0093592 A | 12/2003 |
| WO | WO 99/52307 | 10/1999 |

*Primary Examiner*—Tony T Nguyen
(74) *Attorney, Agent, or Firm*—Lee, Hong, Degerman, Kang & Waimey

(57) ABSTRACT

In a wireless communication system, an apparatus and method for managing an uplink communication between a network and a plurality of terminals is achieved by transmitting a response condition parameter from the network to the plurality of terminals subscribing to a multicast service. The parameter is associated with controlling the uplink communication of the plurality of terminals. The terminals then applies the response control parameter to a predetermined test and responds to the network if the terminal determines that it is qualified to respond to the network in response to a result of the predetermined test. The network evaluates whether the parameter needs to be transmitted to the plurality of terminals and whether the parameter needs to be updated based on at least part of responses received by the network.

17 Claims, 6 Drawing Sheets

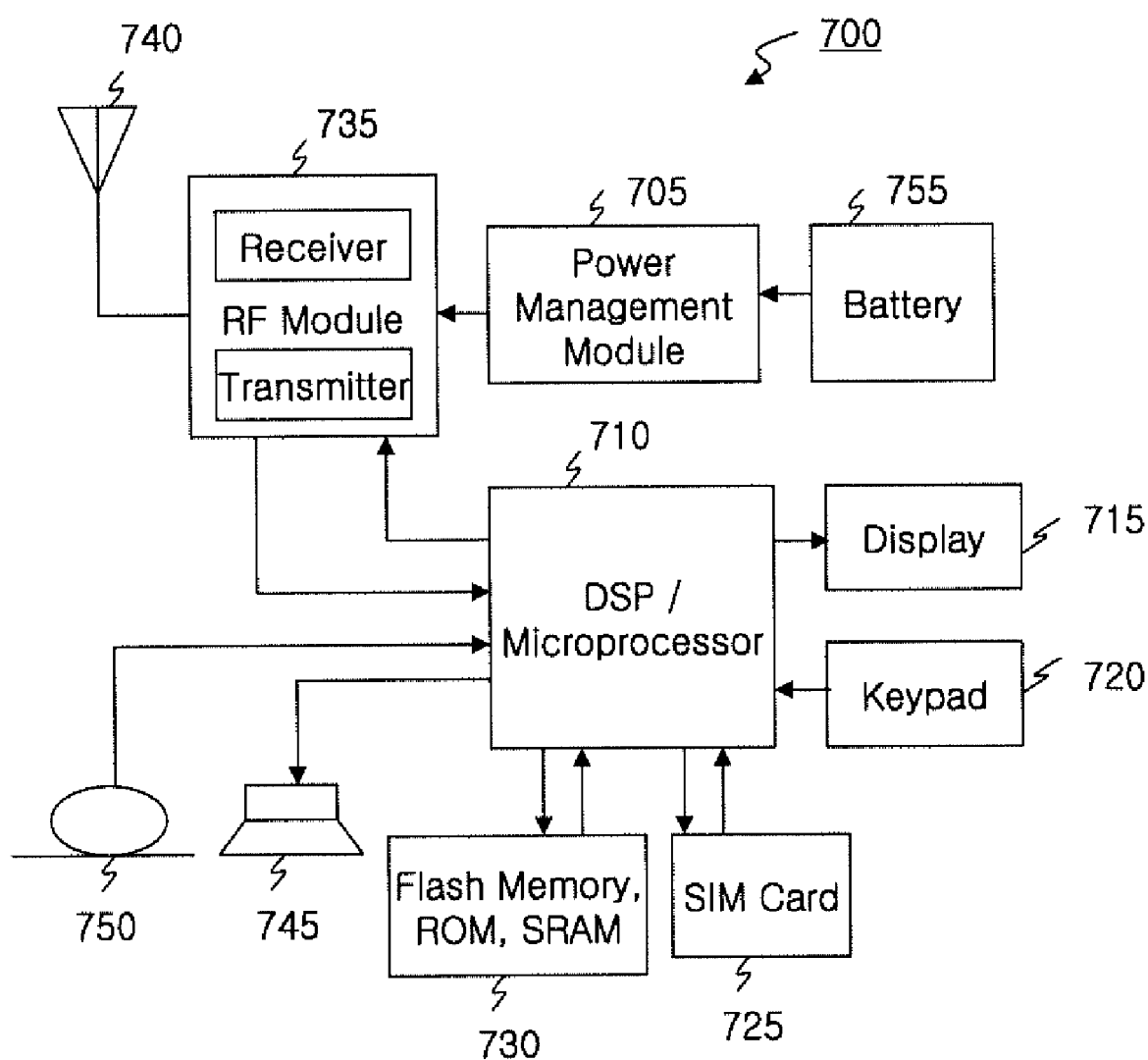

APPARATUS AND METHOD FOR CONTROLLING ACCESS TO NETWORK IN WIRELESS COMMUNICATION SYSTEM

CROSS-REFERENCE TO RELATED APPLICATIONS

This application is a continuation of U.S. application Ser. No. 10/817,493, filed Apr. 2, 2004, now U.S. Pat. No. 7,299,062 which pursuant to 35 U.S.C. § 119(a), claims the benefit of earlier filing date and right of priority to Korean Application No. 2003-021143, filed on Apr. 3, 2003, the contents of which are hereby incorporated by reference herein in their entirety:

BACKGROUND OF THE INVENTION

1. Field of the Invention

The present invention relates to communicating in a wireless communication system and, more particularly, to an apparatus and method for controlling access to a network by mobile terminals.

2. Description of the Related Art

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN 20), which is a new radio access network for supporting W-CDMA access technology in the UMTS.

FIG. 1 illustrates an exemplary basic structure of a general UMTS network. As shown in FIG. 1, the UMTS is roughly divided into a terminal or user equipment (UE) 10, a UTRAN 20, and a core network (CN) 30.

The UTRAN 20 includes one or more radio network subsystems (RNS) 25. Each RNS 25 includes a radio network controller (RNC) 23 and a plurality of Node-Bs (base stations) 21 managed by the RNC 23. The RNC 23 handles the assignment and management of radio resources and operates as an access point with respect to the core network 30.

The Node-Bs 21 receive information sent by the physical layer of the terminal 10 through an uplink, and transmit data to the terminal 10 through a downlink. The Node-Bs 21 operate as access points of the UTRAN 20 for the terminal 10.

The UTRAN 20 constructs and maintains a radio access bearer (RAB) for communication between the terminal 10 and the core network 30. The core network 30 requests end-to-end quality of service (QoS) requirements from the RAB, and the RAB supports the QoS requirements the core network 30 has set. Accordingly, by constructing and maintaining the RAB, the UTRAN 20 can satisfy the end-to-end QoS requirements.

The services provided to a specific terminal 10 are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 23 are connected to the MSC 31 of the core network 30 and the MSC 31 is connected to the GMSC 220 that manages the connection with other networks. For supporting packet switched services, the RNCs 23 are connected to the SGSN 35 and the GGSN 37 of the core network 30. The SGSN 35 supports the packet communications with the RNCs 23 and the GGSN 37 manages the connection with other packet switched networks, such as the Internet.

The 3GPP system can provide multimedia broadcast multicast service (MBMS). The 3GPP TSG SA (Service and System Aspect) defines various network elements and their functions required for supporting MBMS services. A cell broadcast service provided by the conventional system is limited to a service in which text type short messages are broadcast to a certain area. The MBMS service is a more advanced service that multicasts multimedia data to terminals (UEs) 10 that have subscribed to the corresponding service in addition to broadcasting multimedia data. An example of MBMS service includes news channels, music channels, movie channels, etc.

The MBMS service is a downward-dedicated service that provides a streaming or background service to a plurality of terminals 10 by using a common or dedicated downward channel. The MBMS service is divided into a broadcast mode and a multicast mode.

The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

Users who desire to receive the MBMS service first receive a service announcement provided by a network. The service announcement provides the terminal 10 with a list of services to be provided and related information. In addition, the users must receive a service notification provided by the network. The service notification provides the terminal 10 with information related to the broadcast data to be transmitted.

If the user intends to receive the multicast mode MBMS service, the user subscribes to a multicast subscription group. A multicast subscription group is a group of users who have completed a subscription procedure. Once a user has subscribed to the multicast subscription group, the user can join a multicast group to receive a specific multicast service. A multicast group is a group of users that receive a specific multicast service. Joining a multicast group, also referred to as MBMS multicast activation, means merging with the multicast group that has users who wish to receive the specific multicast service. Accordingly, the user can receive the specific multicast data by joining a multicast group (i.e., MBMS multicast activation).

The RNC 23 transfers the MBMS user data to the terminal 10 through the base station (Node-B) 21 via the user plane of the UTRAN protocol. The UTRAN 20 transfers the MBMS user data by constructing and maintaining a radio access bearer (RAB) for a call communication between the terminal 10 and the core network 30. The MBMS user data is transferred only by downlink. The MBMS radio bearer facilitates transferring, only to a specific terminal 10, the user data of a specific MBMS service transferred by the core network 30 to the UTRAN 20.

The MBMS radio bearer is divided into a point-to-multipoint type and a point-to-point type. The UTRAN 20 selects one of the two types of MBMS radio bearers to provide the MBMS service. To select one of the two MBMS radio bearers, the UTRAN 20 should recognize the number of users (terminals 10) of a specific MBMS service existing in one cell.

The UTRAN 20 may count the number of terminals to determine the type of MBMS radio bearer. The UTRAN 20 informs the terminals that it is counting the number of terminals when it provides information about the MBMS service via a MBMS common control channel or performs paging for a specific MBMS service group.

When a terminal 10 receives a service notification of an MBMS service indicating that counting is being performed on the corresponding service, the terminal establishes a connection between an RRC entity of the terminal 10 and an RRC entity of the UTRAN 20 by transferring an RRC connection request message to the UTRAN through an uplink common channel. The RRC connection request message informs the UTRAN that the terminal desires to receive the corresponding MBMS service.

By counting the number of terminals 10 that have transferred an RRC connection request message, the UTRAN 20 can recognize users who desire to receive the specific MBMS service in one cell. The UTRAN 20 then sets up an MBMS radio bearer on the basis of the count.

If the number of users existing in a corresponding cell is smaller than a certain threshold value, the UTRAN 20 sets a point-to-point MBMS radio bearer. If the number of users existing in a corresponding cell is greater than or equal to a certain threshold value, the UTRAN sets a point-to-multipoint MBMS radio bearer. However, the conventional paging method through which the UTRAN 20 recognizes the number of terminals 10 that desire to receive an MBMS service has the shortcomings.

When the UTRAN 20 performs the MBMS service notification, response messages, such as RRC response messages, are sent from terminals 10 that desire to receive the MBMS service. The response messages are simultaneously concentrated at uplink channel, resulting in an increase in interference and load on the uplink. Because the UTRAN 20 performs the MBMS service notification to the plurality of terminals 10 using the MBMS common control channel and the corresponding terminals 10 simultaneously inform the UTRAN 20 that they want to receive the corresponding MBMS service through the uplink common channel both the interference and load on the uplink increases.

Because the interference and load increases, an undesirably long period of time may be required for the terminals 10 to send response messages. For this reason, some terminals may fail to transmit the response message by the time when then UTRAN 20 should set up the MBMS radio bearer.

Once the UTRAN 20 receives a number of response messages from the terminals 10 that is above the threshold for setting up the MBMS point-to-multipoint radio bearer up to, the UTRAN does not need to receive any additional response messages because all requirements for selecting the radio bearer have been met. However, in the conventional art, even if the UTRAN 20 has already received above a threshold number of response messages, the UTRAN continues to receive response messages up until the MBMS radio bearer is set. Therefore, uplink radio resources are undesirably wasted.

SUMMARY OF THE INVENTION

An object of the present invention is to provide an uplink communication management apparatus and method in a mobile communication system capable of alleviating uplink congestion that wastes radio resources during a multicast/broadcast service.

According to a method for managing an uplink communication between a network and a plurality of terminals in a wireless communication system, the method comprising the steps of: transmitting a parameter (such as access information or response condition) from the network to the plurality of terminals subscribing to, for example, a multicast service. The parameter is associated with controlling the uplink communication of the plurality of terminals. The method further comprises applying the parameter to a predetermined test in at least one of the plurality of terminals and responds to the network if the at least one of the plurality of terminals determines that the at least one of the plurality of terminals is qualified to respond to the network in response to a result of the predetermined test. The network then evaluates whether the parameter needs to be transmitted to the plurality of terminals and whether the parameter needs to be updated based on at least part of responses received by the network.

According to one aspect of the invention, preferably, the step of evaluating whether the parameter needs to be transmitted comprises determining whether a sufficient number of terminals has responded. If the sufficient number of terminals has responded then the network setups a point-to-multipoint radio bearer for the service. If the sufficient number of terminals has not responded then the network setups a point-to-point radio bearer for the service. Preferably, the step of evaluating whether the parameter needs to be updated is based on total responses from terminals in a cell serviced by the network.

According to another aspect of the invention, the parameter is selected by the network so that the total number of responses is less than the plurality of terminals subscribing to the service. Also, in response to the evaluation step, the network updates the parameter from the network in response to a total number of responses received. Alternatively, the network halts the updating of the parameter when the total number of responses satisfies a predetermined condition defined in the network.

According to another embodiment of the present invention, a method for managing an uplink communication comprises decoding a radio channel to check presence of a parameter from the network for use in a particular process in the terminal, wherein the parameter is associated with controlling the uplink communication from the terminal that is subscribing to an MBMS service provided by the network; receiving the parameter from the radio channel; applying the parameter to a predetermined test in the terminal; determining whether the terminal is qualified to respond to the network in respond to a result of the predetermined test; responding to the network by sending a response message if the terminal is qualified to respond to the network; and repeating the above steps if the terminal is not qualified to respond to the network. Preferably, the step of repeating comprises using an updated parameter from the network. Also, the step of repeating is performed for the particular process in the terminal.

According to one aspect of the invention, the parameter from the network is associated with selectively controlling whether the terminal needs to send the response message to the network.

According to yet another embodiment of the present invention, a method for managing an uplink communication between a network and a plurality of terminals in a wireless communication system comprises transmitting a parameter from the network to the plurality of terminals subscribing to, for example, a multicast service, wherein the parameter is associated with controlling the uplink communication of the plurality of terminals; receiving response signals from a selected group of the plurality of terminals, wherein the response signals are in response to the parameter transmitted from the network; and evaluating whether the parameter needs to be transmitted to the plurality of terminals and whether the parameter needs to be updated based on at least part of responses received by the network.

According to another embodiment, a wireless communication system comprises a plurality of terminals being serviced in a cell; and a network for transmitting a parameter to the plurality of terminals subscribing to a service, wherein the parameter is associated with controlling the uplink communication of the plurality of terminals, wherein at least one of the plurality of terminals applying the parameter to a predetermined test, and responding to the network if the at least one of the plurality of terminals determines that the at least one of the plurality of terminals is qualified to respond to the network in response to a result of the predetermined test, and the network evaluating whether the parameter needs to be transmitted to the plurality of terminals and whether the parameter needs to be updated based on at least part of responses received by the network.

According to another embodiment of the invention, a wireless terminal for managing an uplink communication in a wireless communication system comprises a decoding means for decoding a radio channel to check presence of a parameter from the network for use in a particular process in the terminal, wherein the parameter is associated with controlling the uplink communication from the terminal that is subscribing to a service provided by the network; and a processor for receiving the parameter from the radio channel and applying the parameter to a predetermined test in the terminal and determining whether the terminal is qualified to respond to the network in respond to a result of the predetermined test and responding to the network by sending a response message if the terminal is qualified to respond to the network, wherein if the terminal is not qualified to respond to the network then the decoding means rechecks the presence of the parameter and the processor applies the parameter to the predetermined test to determine whether the terminal is qualified to respond to the network. Preferably, the processor is adapted to use an updated parameter from the network.

According to one embodiment of the invention, a network for managing an uplink communication in a wireless communication system comprises means for transmitting a parameter from the network to the plurality of terminals subscribing to a service, wherein the parameter is associated with controlling the uplink communication of the plurality of terminals; means for receiving response signals from a selected group of the plurality of terminals, wherein the response signals are in response to the parameter transmitted from the network; and means for evaluating whether the parameter needs to be transmitted to the plurality of terminals and whether the parameter needs to be updated based on at least part of responses received by the network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 6 illustrates a block diagram of mobile terminal according to the preferred embodiment of the present invention.

DETAILED DESCRIPTION OF THE PREFERRED EMBODIMENTS

Figure 1:
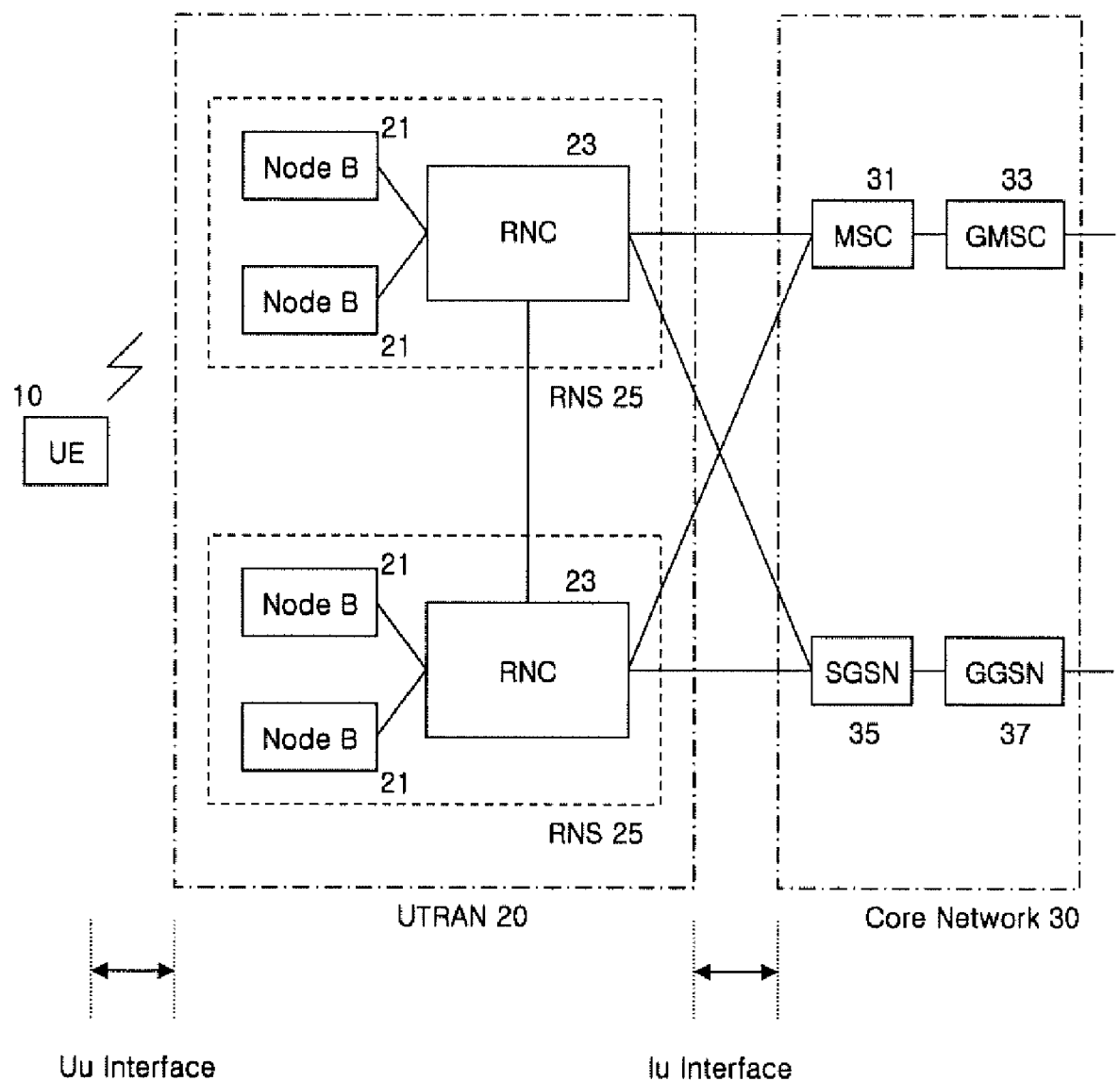
FIG. 1 illustrates a network structure of a general 3GPP UMTS system.

The present invention relates to a method for reducing congestion of an uplink by controlling how the terminals transmit their response messages to the network. Although the present invention is illustrated with respect to a mobile communication system such as UMTS (Universal Mobile Telecommunication System) developed by the 3GPP, it may also be applied to other communication systems operating under similar or different standards that utilize different air interfaces, such as CDMA based systems. In addition, although the term "UTRAN" is described in the embodiments of the present invention, such term may be substituted with "network" without deviating from the gist of the invention.

In one embodiment of the present invention, a method for reducing congestion of an uplink controls how the terminals transmit their response messages to the network. When responses are received from some terminals after access information is sent that allows some terminals to respond, it is determined whether subsequent access information needs to be sent to some terminals based on the received responses.

Access information, also referred to as response condition information, may include various types of uplink control parameters such as terminal grouping information, response timing information, and response probability factors. Initial access information and subsequent access information may be the same or may be different.

For example, access information may pertain to an uplink load condition or a response condition for the terminal, while the response condition may include group identification information or time information. Although methods employing terminal grouping information are illustrated, it can be understood by those skilled in the art that other types of access information may also be easily applicable to the techniques of the present invention.

The methods of the present invention may be performed during an access procedure for a particular terminal. The access procedure for a particular terminal may begin when the terminal correctly receives one downlink (DL) message and end when the terminal sends one uplink (UL) message. Alternately, the access procedure for a particular terminal may begin when the terminal correctly receives one downlink (DL) message and end when the terminal recognizes that no more downlink messages for that particular procedure will be transmitted.

A paging procedure may be performed for groups of terminals in order to distribute the transmission of response messages. Unlike the conventional art, where the UTRAN simultaneously informs a plurality of terminals about an MBMS service by using the MBMS common control channel, the UTRAN may distributively transfer an MBMS service notification to groups of terminals so that response message transmissions via the uplink common channel for each terminal group are performed at different times rather than simultaneously.

In another embodiment of the present invention, a method for minimizing the waste of radio resources controls the number of response messages transmitted from the terminals for an MBMS service. Response messages from the terminals, required for setting up an MBMS radio bearer, are distributively counted.

Distributive counting may be performed by discriminating and sampling the response messages several times instead of performing the count all at once. The number of sampled response messages may be arbitrarily set. Instead of simultaneously receiving and counting the response messages from terminals, the response messages are initially received and counted from only a limited number of terminals. Response messages are received and counted from other terminals only if the number of terminals initially providing responses does not exceed a threshold value. The limited number of terminals may be based on how the terminals are grouped together.

In order to implement the present invention, terminals that desire to receive a specific MBMS service are preferably classified into one or more groups. The classification may be performed by the UTRAN, preferably by a radio network controller (RNC) of the UTRAN.

Group classification may be preformed whenever a user subscribes to the MBMS service. Alternatively, group classification may be preformed whenever a paging message, or response request message, is transmitted to a terminal by using information about past service access frequency by each terminal or performance information of each terminal. Classification whenever a user subscribes to the MBMS service is hereafter, referred to as a first classification method. Classification whenever a paging message, or response request message, is transmitted to a terminal is hereafter referred to as a second classification method.

Various types of classifications may be applied to the present invention. For example, the UTRAN may classify those terminals that frequently use a specific service into one group. Alternatively, the UTRAN can randomly classify all the terminals in order to evenly distribute the terminals into different groups.

When the terminals are classified into one or more groups, the terminals must be informed of which group they belong to. The UTRAN transmits information to the terminal indicating to which group it belongs. This information may be response condition information added to a response request message and transmitted.

The response condition information may include identification information of a group that needs to transfer a response message or identification information of one or more terminals belonging to the group. In addition, the response condition information may include information required for determining to which group the terminal having received a response request belongs.

The response condition information indicates which terminal should respond to a response request message and may also include time information indicating when the terminal can transfer a response message. For example, the time information may include frame information for transferring a response message, a timer value to be used for transmission or a transmission limit time of a response message.

In another embodiment of the present invention, a method for counting the number of terminals in one cell that desire to receive a specific MBMS service transmits a response request message, or paging message, to each terminal group on the basis of the two types of group classifications.

Figure 2:
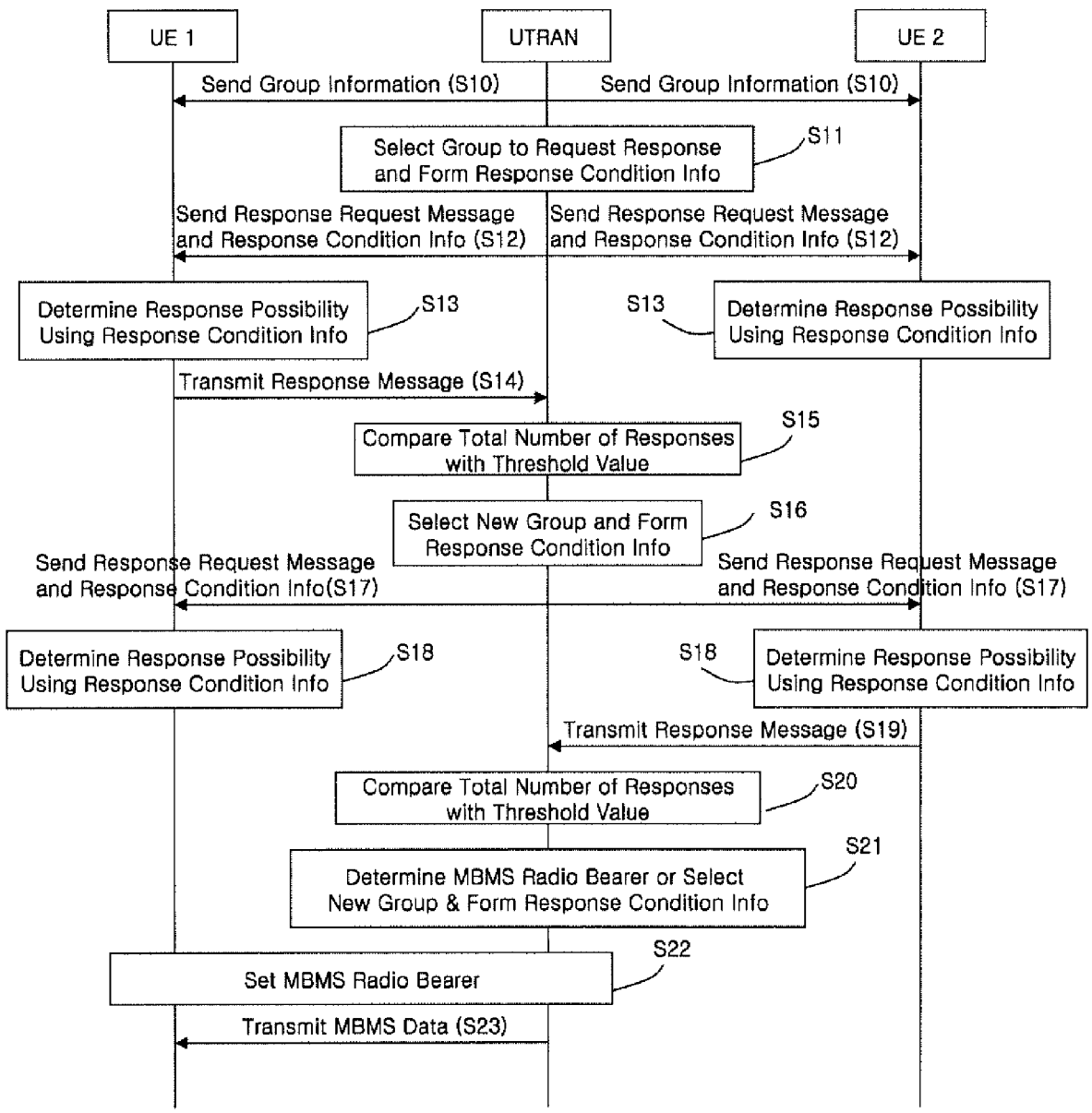
FIG. 2 illustrates a signal flow chart of an upward response message distributing method of a mobile communication system in accordance with a first embodiment of the present invention.

Referring to FIG. 2, a signal flow chart of an uplink response message distributing method of a mobile communication system in accordance with a first embodiment of the present invention. The first embodiment is based on the first group classification method, whereby terminal classification is performed whenever a user subscribes to, for example, an MBMS service. Although the method is illustrated using two terminals, UE 1 and UE 2, which are assumed to belong to both a first group and a second group, the method is applicable to any terminal groups containing at least one terminal.

As illustrated in FIG. 2, when a user terminal subscribes to an MBMS service, the UTRAN informs the user terminals to which group each terminal belongs by transferring group information to the terminals (step S10). The group information may include a group identifier.

Thereafter, the UTRAN sets up an MBMS radio bearer to provide the MBMS service. In order to set up the radio bearer, the UTRAN must recognize how many users desire to receive a specific MBMS service. In order to count the number of users for the specific service, the UTRAN selects one group, for example a first group, from previously classified terminal groups and configures the response condition information for the selected first group (step S11).

Once the group is selected and the response condition information is configured, the UTRAN transmits a response request message to the first group. As illustrated in FIG. 2, the first group includes UE 1 and UE 2 (step S12). The response request message includes the response condition information previously configured in step S11.

When the response request message is transferred from the UTRAN through an MBMS common control channel, the information that a count is being performed for a corresponding MBMS service is received by the terminals, including UE 1 and UE 2, of the first group. The terminals of the first group determine whether to transfer a response message to the UTRAN on the basis of the response condition information contained in the received response request message (step S13).

Each of the terminals, including UE 1 and UE 2, in the first group checks whether response condition information is contained in the corresponding response request message. If there is no response condition information in the response request message, the terminals each transmit a response message to the UTRAN for the specific MBMS service. If there is response condition information in the response request message, each terminal determines whether they can satisfy the response condition by using the received response condition information. If a terminal can satisfy the response condition, it transmits a response message to the UTRAN. If a terminal cannot satisfy the response condition, it does not transfer a response message to the UTRAN.

As illustrated in FIG. 2, if UE 1 qualifies to transmit a response message, then such message is transmitted to the UTRAN. Similarly, if UE 2 does not qualify to transmit a response message, no such message is transmitted to the UTRAN. Therefore, UE 1 transmits a response message to the response request message to the UTRAN (step S14), while UE 2 does not. In addition to UE 1, other terminals of the first group may transmit a response message to the UTRAN as long as they are allowed to do so. The UTRAN determines the number of response messages received from terminals of the first group, and compares the total number of received responses with a threshold value (step S15).

If the total number of response messages is greater than, or equal to, the threshold value, the UTRAN stops transmission of the response request message, sets up point-to-multipoint radio bearer for the MBMS service, and transfers MBMS data to the terminals in the first group (steps S22 and S23). Therefore, if the number of received response messages is greater than, or equal to, the threshold value required for setting up the MBMS point-to-multipoint radio bearer, the UTRAN does not receive any additional response messages from the terminals because the requirements for selecting a radio bearer has been achieved.

If the total number of response messages is smaller than the threshold value in step S15, the UTRAN selects another group, for example a second group including UE 1 and UE 2, from the groups to which the response request message has not yet been transferred, and configures new response condition information for the selected second group (step S16). When the selection of the second group and the configuration of the response condition information are completed, the UTRAN transfers a response request message to the terminals, including UE 1 and UE 2, of the second group (step S17). The response request message preferably includes the new response condition information configured in step S16.

Each of the terminals, including UE 1 and UE 2, in the second group determine whether to transmit a response message on the basis of the received response condition (step S18). As illustrated in FIG. 2, UE 1 cannot transfer a response message, while UE 2 can transfer a response message. Therefore, UE 2 transmits a response message to the response request message to the UTRAN (step S19), while UE 1 does not. Other terminals of the second group may transfer a response message to the UTRAN as they are allowed to do so.

The UTRAN again determines the number of response messages received from the terminals of the second group, including the response from UE 2, and adds that number to the number of previously received response messages, including the response from UE 1. The UTRAN compares the total number of responses with the threshold value (step S20).

If the total number of responses is greater than, or equal to, the threshold value, steps S22 and S23 are performed, whereby the UTRAN stops transmission of the response request message, sets up point-to-multipoint radio bearer for the MBMS service, and transfers MBMS data to the terminals in the first group and second group. If the total number of responses is still smaller than the threshold value, the UTRAN either sets up a radio bearer according to the existence of a group to which the UTRAN can transfer a response request message or selects a new group and configures response condition information (step S21).

If the total number of responses is still smaller than the threshold value and there are no other groups to which the UTRAN can transmit a response request message, the UTRAN determines that a point-to-point MBMS radio bearer is to be set. If the total number of responses is still smaller than the threshold value and there is another group to which the UTRAN can transmit a response request message, the UTRAN selects a new group, for example a third group, among those groups to which the UTRAN has not yet transmitted a response request message. The UTRAN configures response condition information for the third group and repeats steps S17 through step S20 until either the total number of responses is greater, or equal to, the threshold or there are no other groups to which the UTRAN can transmit a response request message.

Figure 3:
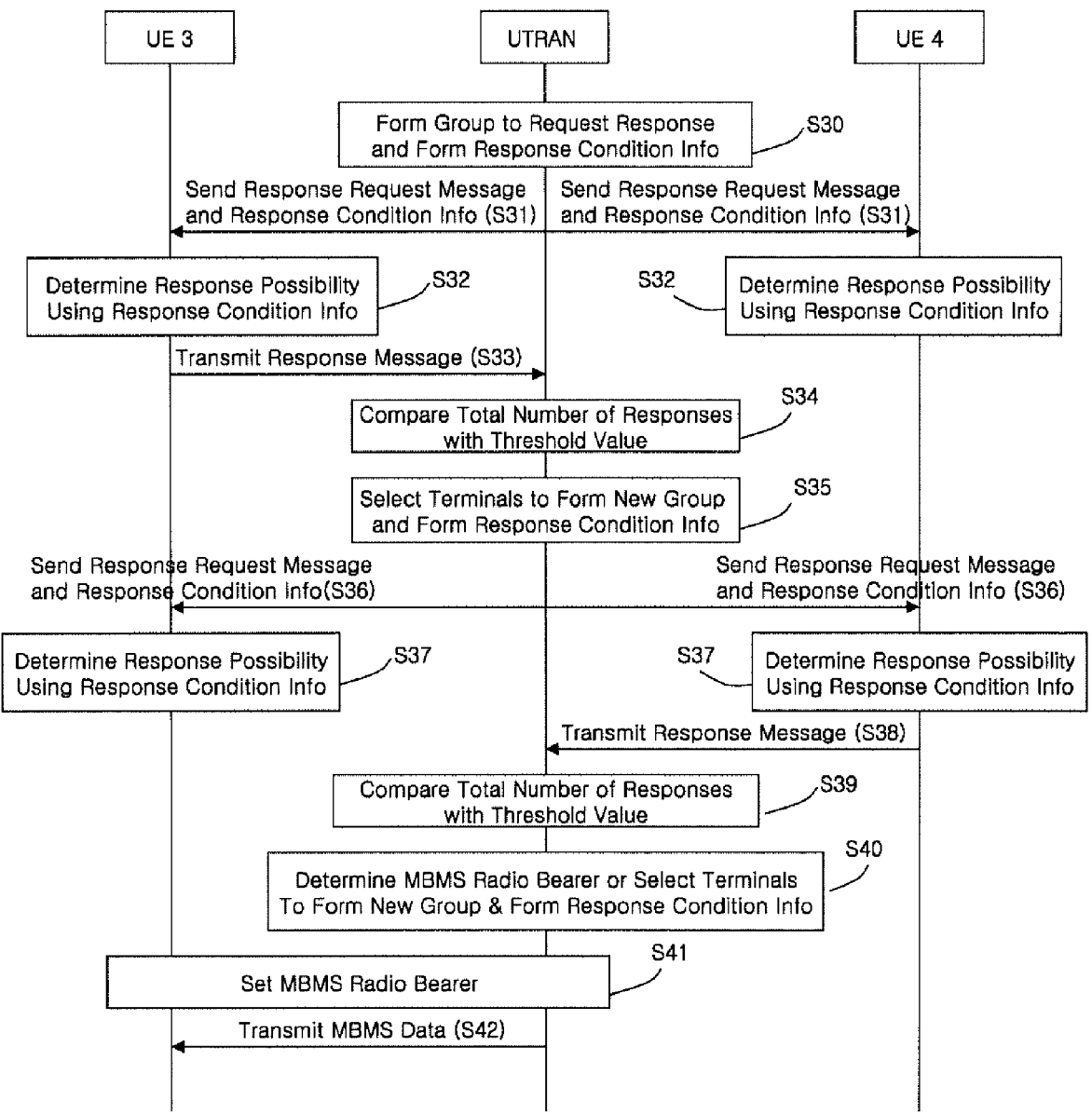
FIG. 3 illustrates a signal flow chart of an upward response message distributing method of a mobile communication system in accordance with a second embodiment of the present invention.

Referring to FIG. 3, a signal flow chart of an uplink response message distributing method of a mobile communication system in accordance with a second embodiment of the present invention is illustrated. The second embodiment is based on the second group classification method, whereby terminal classification is performed whenever a paging message, or response request message, is transmitted to a plurality of terminals. Although the method is illustrated using two terminals, UE 3 and UE 4, which are assumed to belong to both a first group and a second group, the method is applicable to any terminal groups or a cell containing at least one terminal.

As illustrated in FIG. 3, the UTRAN determines, or forms, a first group from which a response is to be requested in order to count the total number of terminals that desire to receive a specific MBMS service and configures response condition information for the group (step S30). The response condition information may be formed by using mobile terminal identifiers (for example, using last digit of the terminal identification number), or a number that can be used by the terminal to determine whether the terminal is a candidate terminal to respond to the UTRAN. Alternatively, any other parameters that can be used to distinguish and thus control access to the network may be used. The UTRAN forms the group by selecting at least one terminal to which the specific MBMS service is to be transmitted. As illustrated in FIG. 3, the first group includes, for example, UE 3 and UE 4.

Once the group is formed and the response condition information is configured, the UTRAN transmits a first paging message, or response request message, to the first group that includes UE 3 and UE 4 (step S31). The response request message includes the response condition information previously configured in step S30.

Each of the terminals in the first group, including UE 3 and UE 4, determine whether to transfer a response message to the UTRAN on the basis of the response condition information contained in the received response request message (step S32). If a terminal can satisfy the response condition, it transmits a response message to the UTRAN. If a terminal cannot satisfy the response condition, it does not transfer a response message to the UTRAN.

As illustrated in FIG. 3, UE 3 qualifies to transfer a response message while UE 4 does not qualify to transfer a response message. Therefore, UE 3 transmits a response message to the response request message to the UTRAN (step S33), while UE 4 does not. In addition to UE 3, other terminals of the first group may transmit a response message to the UTRAN as long as they are allowed to do so. The UTRAN determines the number of response messages received from terminals of the first group, and compares the total number of received responses with a threshold value (step S34).

If the total number of response messages is greater than, or equal to, the threshold value, the UTRAN stops transmission of the response request message, sets up point-to-multipoint radio bearer for the MBMS service, and transfers MBMS data to the terminals in the first group (steps S41 and S42). Therefore, if the number of received response messages is greater than, or equal to, the threshold value required for setting up the MBMS point-to-multipoint radio bearer, the UTRAN does not receive any additional response messages from the terminals because the requirements for selecting a radio bearer has been achieved.

If the total number of response messages is smaller than the threshold value in step S34, the UTRAN selects one or more terminals to which no response request message has been transmitted, forms a new group, for example a second group including UE 3 and UE 4, and configures new response condition information for the new group (step S36). When the second group is formed and the configuration of the response condition information is completed, the UTRAN transfers a response request message to the second group (step S36). The response request message preferably includes the new response condition information configured in step S35.

The terminals, including UE 3 and UE 4, of the second group determine whether to transmit a response message on the basis of the received response condition (step S37). As illustrated in FIG. 3, UE 3 cannot transfer a response message, while UE 4 can transfer a response message. Therefore, UE 4 transmits a response message to the response request message to the UTRAN (step S38), while UE 3 does not. Other terminals of the second group may transfer a response message to the UTRAN as they are allowed to do so.

The UTRAN again determines the number of response messages received from the terminals of the second group, including the response from UE 4, and adds that number to the number of previously received response messages, including the response from UE 3. The UTRAN compares the total number of responses with the threshold value (step S39).

If the total number of responses is greater than, or equal to, the threshold value, steps S41 and S42 are performed, whereby the UTRAN stops transmission of the response request message, sets up point-to-multipoint radio bearer for the MBMS service, and transfers MBMS data to the terminals in the first group and new group. If the total number of responses is still smaller than the threshold value, the UTRAN either sets up a radio bearer according to the existence of a group to which the UTRAN can transfer a response request message or determines a new group and configures response condition information (step S40).

If the total number of responses is still smaller than the threshold value and there are no other terminals to which the UTRAN can transmit a response request message, the UTRAN determines that a point-to-point MBMS radio bearer is to be set. If the total number of responses is still smaller than the threshold value and there is at least one other terminal to which the UTRAN can transmit a response request message, the UTRAN forms a new group, for example a third group, from terminals to which the UTRAN has not yet transmitted a response request message. The UTRAN configures response condition information for the third group and repeats steps S36 through S39 until either the total number of responses is greater than, or equal to, the threshold or there are no other terminals to which the UTRAN can transmit a response request message.

Meanwhile, if the total number of the added response messages is smaller than the threshold value, and there are no more groups to receive the response request message, the UTRAN selects a new group from the groups that have not yet received a response request message. The UTRAN configures response condition information for the selected new group, and then the step S36 is performed again (step S40). Thereafter, the UTRAN sets up a radio bearer determined in step S40, and transfers MBMS data to the terminals through the radio bearer (steps S41 and S42).

Each terminal determines whether to transmit a response message after receiving the response condition information. The following equation (1) shows an example of response condition information:

(1) (UE Id mod M)=R, wherein 'mod' signifies a UE Id/M calculation.

In equation (1), 'UE Id' indicates a terminal identifier used for identifying a specific terminal. The terminal identifier may include an IMSI (Internal Mobile Subscriber Identity), a TMSI (Temporary Mobile Subscriber Identity), or an RNTI (Radio Network Temporary Identity). The value 'M' indicates the maximum number of response messages transmittable by the UTRAN, for example a number corresponding to the total number of groups. There are two types of 'R' values; an 'Rn' value that the UTRAN transfers and an 'Ru' value that the terminal calculates.

The UTRAN can add one 'M' and one or more 'Rn's in the response request message as response condition information for receiving a specific MBMS service. The terminals obtain the values 'M' and 'Rn' from the received response request message. The response request messages that are continuously repeated for the same MBMS message have the same 'M' but may have different 'Rn's. Obtaining the values 'M' and 'Rn' from the response condition information included in the response request message can determine whether a terminal transfers a response message.

After the terminals calculate their 'Ru' value according to equation (1) by using the obtained value 'M' and their own 'UE Id', the calculated 'Ru' value is compared with one or more 'Rn's values received from the UTRAN. If an 'Rn' value exists that equals the 'Ru' value, the response condition information is satisfied and the terminal transmits a response message to the UTRAN. If there is no Rn value that equals the Ru value, the terminal does not satisfy the response condition and no response message is sent to the UTRAN.

For example, if the UE Id is '8' and M=4 and Rn=0 is received from the UTRAN, the remaining portions of equation (1) is '0'. Therefore, the 'Ru' value of the terminal is '0'. Since Rn=Ru, the corresponding terminal transmits a response message to the UTRAN.

In addition, the number of response messages can be controlled by controlling the Rn value. The UTRAN can control the Rn value such that the number of response messages to be sampled is set.

For example, the UTRAN may set the response condition information to M=4 and Rn=0,1 in a first transmitted response request message and may set the response condition information to M=4 and Rn=3 in a second transmitted response request message. The terminals satisfying the response condition information included in the first response request message corresponds to a first group and the terminals satisfying the response condition information included in the second response request message corresponds to a second group. The terminals belonging to the first group would most likely transfer more response messages than the terminals belonging to the second group because the number of terminals having Rn=0 or 1 would be greater than the number of terminals having Rn=3.

Alternately, the UTRAN may set the response condition information as M=4 and Rn=3 in the first transmitted response request message and set the response condition information as M=4 and Rn=0,2 in the second transmitted response request message. The total number of response messages transmitted by terminals belonging to the second group would most likely be greater than the total number of response messages transmitted by terminals belonging to the first group. Therefore, the UTRAN has not yet received enough response messages from the terminals and the uplink can accommodate more response messages from additional terminals. The UTRAN then controls the Rn value to suitably control the number of response messages.

Figure 4:
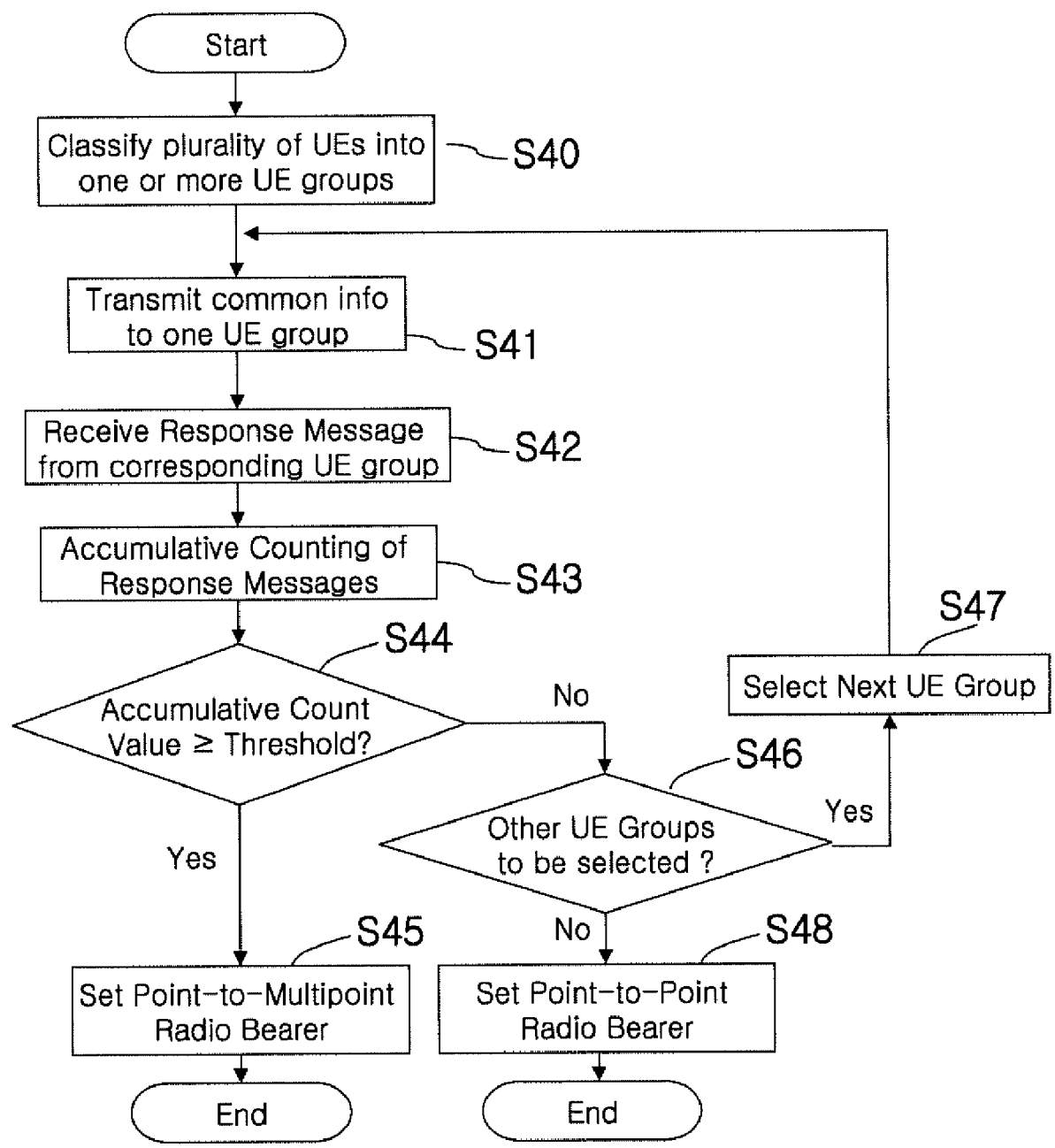
FIG. 4 is a flow chart illustrating an access controlling method in a network according to an embodiment of the present invention.

FIG. 4 is a flow chart illustrating an access control by a network (for example, UTRAN) according to an embodiment of the present invention. The first and second embodiments of the present invention preferably have the same operations except for the terminal group classification method (S10 in FIG. 2).

As illustrated in FIG. 4, the UTRAN classifies a plurality of terminals that are to receive MBMS service into at least one or more terminal groups (step S40). The UTRAN then selects one of the terminal groups, transfers common information such as response request messages thereto, and receives response messages from the corresponding terminal groups (steps S41 and S42).

The UTRAN forms an accumulated count of the number of received response messages and compares the accumulated response message count with a threshold value (step S43 and S44). If the accumulative count is greater than, or equal to, the threshold value, the UTRAN sets a point-to-multipoint radio bearer (step S45). If the accumulative count is smaller than the threshold value, the UTRAN checks whether there are any additional terminal groups to be selected (step S46).

If there is at least one other terminal group to be selected, the UTRAN selects a new terminal group and repeats steps S41 through step S44. If there is no additional terminal group to be selected, the UTRAN sets up a point-to-point MBMS radio bearer (step S48).

Through the above process, the UTRAN can recognize whether terminals exist in a specific group, or recognize the number of terminals that exist in a specific group, in order to set up the MBMS radio bearer. In the present invention, the existence of terminals in a specific group or the number of terminals that exist in a specific group for setting up the MBMS radio bearer is recognized when response messages are received from terminal groups. Therefore, uplink signal congestion can be minimized and, specifically, transmission of unnecessary response messages from the terminals can be prevented.

The message transfer method in a mobile communication system of the present invention has several advantages.

Unlike the conventional art, in which response messages are concentrated to the MBMS common control channel, the response messages from the terminals can be effectively dispersed because the paging message is distributively transferred in accordance with terminal groups. Therefore, uplink signal congestion can be minimized because the MBMS service notification is not made simultaneously to a plurality of terminals, but rather made distributively according to terminal groups such that different transmission time points are set for transferring the response messages from the terminals through the uplink common channel.

Furthermore, the total number of response messages from the terminals can be controlled. Response messages are not simultaneously received from numerous terminals and then counted, but rather received first from the terminals of a certain group. If the number of response messages from the first terminal group is greater than, or equal to, a threshold value, no more response messages need be received from other terminal groups. Because the number of response messages transmitted by the terminals is controlled, undesirable waste of radio resources can be reduced in providing MBMS services.

Figure 5:
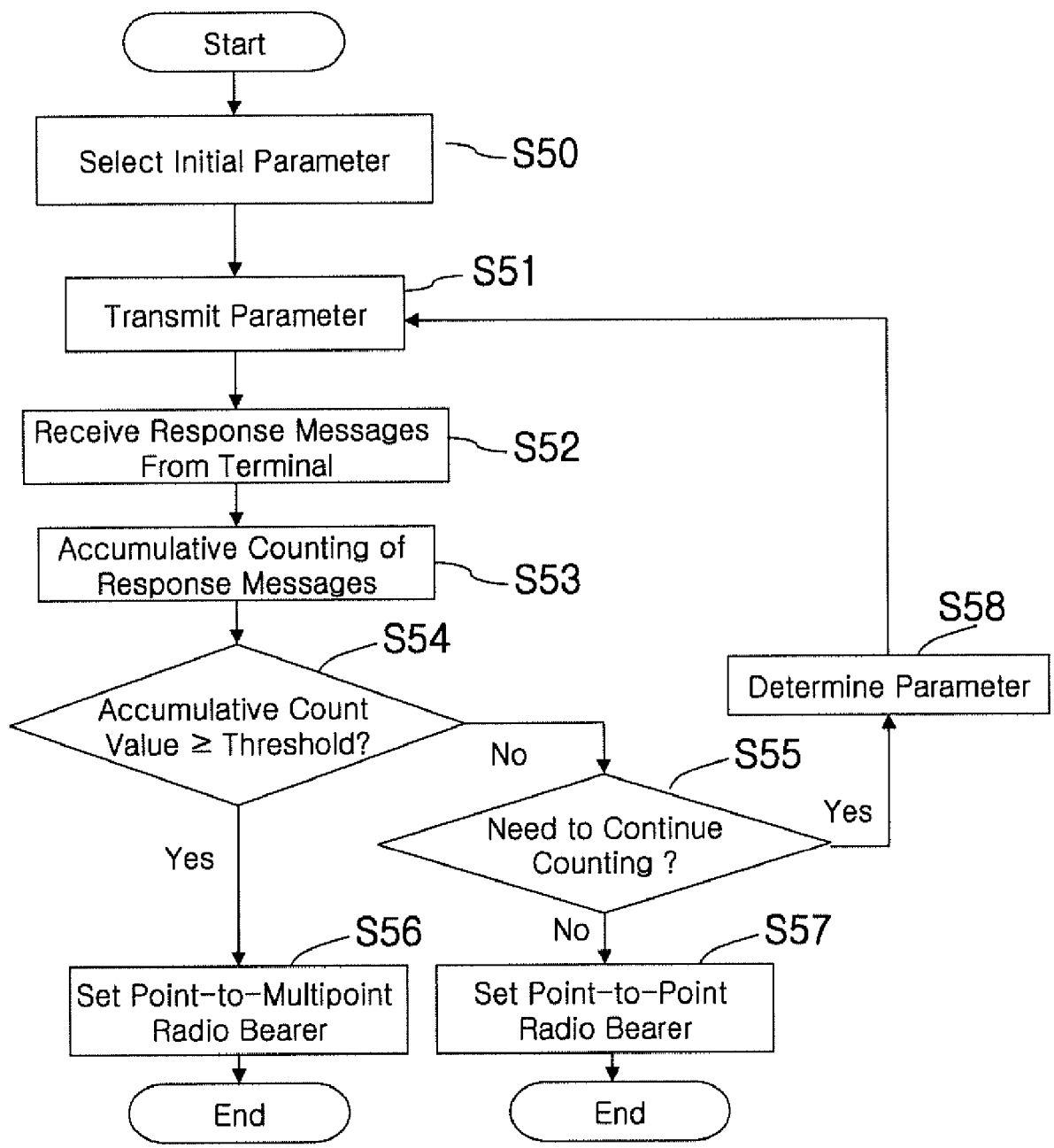
FIG. 5 is a flow chart illustrating an access controlling method in a network according to another embodiment of the present invention.

FIG. 5 is a flow chart illustrating an access controlling method in a network according to another embodiment of the present invention.

Referring to FIG. 5, the UTRAN selects an initial parameter (for example, response condition information) in step S50 and transmits such parameter to one or more terminals subscribing to a particular MBMS service, such as a news channel (step S51). The UTRAN then receives responses from one or more terminals that qualifies to respond in response to the initial parameter (step S52).

The UTRAN forms an accumulated count of the number of received responses and compares the accumulated response message count with a threshold value (step S54). If the accumulative count is greater than, or equal to, the threshold value, the UTRAN sets a point-to-multipoint radio bearer (step S56). If the accumulative count is smaller than the threshold value, the UTRAN checks whether there is a need to continue counting the terminals to decide point-to-point or point-to-multipoint transmission (step S55).

If there is a need for continued counting, the UTRAN updates (or sometimes uses the same parameter) the parameter and repeats steps S51 through step S54. If there is no need for continue counting, the UTRAN sets up a point-to-point MBMS radio bearer (step S57).

Through the above process and device, the UTRAN controls the uplink congestion caused by all terminals that subscribe to a particular service in a cell from responding to the UTRAN. By controlling the selection or sampling of a subset of such terminals for setting up an MBMS radio bearer, the UTRAN minimizes the uplink traffic congestion. Such selective response control of the terminals may be carried out by transmitting a parameter from the UTRAN which will be used by each terminal in a group (for example, subscribing to a particular MBMS service) to determine whether such terminal qualifies to respond to the response request message. If the responses from the terminals are insufficient (for example, the responses are below a certain threshold value) then the UTRAN decides whether to update the parameter and also whether to retransmit such parameter to the terminals in the group. Because the number of response messages transmitted by the terminals is controlled, undesirable waste of radio resources can be reduced in providing MBMS services.

FIG. 6 illustrates a block diagram of mobile terminal according to the preferred embodiment of the present invention. Both the mobile station and the network system may utilize the present invention. Referring to FIG. 9, the mobile station 700 comprises a processor (or digital signal processor) 710, RF module 735, power management module 705, antenna 740, battery 755, display 715, keypad 720, memory 730, SIM card 725 (which may be optional), speaker 745 and microphone 750.

A user enters instructional information, such as a telephone number, for example, by pushing the buttons of a keypad 720 or by voice activation using the microphone 750. The microprocessor 710 receives and processes the instructional information to perform the appropriate function, such as to dial the telephone number. Operational data may be retrieved from the Subscriber Identity Module (SIM) card 725 or the memory module 730 to perform the function. Furthermore, the processor 710 may display the instructional and operational information on the display 715 for the user's reference and convenience.

The processor 710 issues instructional information to the RF section 735, to initiate communication, for example, transmit radio signals comprising voice communication data. The RF section 735 comprises a receiver and a transmitter to receive and transmit radio signals. An antenna 740 facilitates the transmission and reception of radio signals. Upon receiving radio signals, the RF module 735 may forward and convert the signals to baseband frequency for processing by the processor 710. The processed signals would be transformed into audible or readable information outputted via the speaker 745, for example.

It will be apparent to one skilled in the art that the preferred embodiments of the present invention can be readily implemented using, for example, the processor 710 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teachings can be readily applied to other types of methods and systems. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structure equivalents but also equivalent structures.

What is claimed is:

1. A method for transmitting a message in a mobile communication system, comprising:
   configuring response condition information;
   transmitting the configured response condition information to a plurality of terminals;
   determining, by each of the plurality of terminals, whether to respond based on the response condition information; and
   responding to a network if it is determined to respond, by at least one terminal that is qualified to respond among the plurality of terminals.

2. The method of claim 1, further comprising updating the response condition information based on a response received from said at least one terminal that is qualified to respond.

3. The method of claim 2, further comprising transmitting the updated response condition information to a plurality of new terminals.

4. The method of claim 2, wherein the updating comprises:
   comparing a total number of received responses and previously received responses with a threshold value;
   determining a radio bearer for a multimedia broadcast multicast service (MBMS) service as a point-to-multipoint radio bearer if the total number is larger than the threshold value, and checking whether there are terminals to which the response condition information is to be transmitted if the total number is less than the threshold value; and
   updating the response condition information for the plurality of new terminals if there are a plurality of new terminals to which the response condition information is to be transmitted.

5. The method of claim 1, wherein the response condition information is updated when the total number is less than the threshold value, and when there are a plurality of terminals to which the response condition information is to be transmitted.

6. The method of claim 1, wherein the response condition information is differently set up for each terminal.

7. The method of claim 1, wherein the response condition information comprises identification information about a group to which a response message is to be transmitted, or identification information about one or more terminals that belong to a corresponding group.

8. The method of claim 1, wherein the response condition information comprises information required for determining to which group a terminal having received the response request message belongs, and information about whether a specific terminal is qualified to respond.

9. The method of claim 8, wherein if the response condition information indicates whether a specific terminal is qualified to respond, a corresponding terminal comprises time information for transmitting a response message.

10. The method of claim 9, wherein the time information is frame information for transferring the response message, or a timer value to be used for transmission, or a transmission limit time of the response message.

11. A method for transmitting a message in a mobile communication system, comprising:
   receiving, by one or more terminals, response condition information from a network;

determining whether the one or more terminals are qualified to respond based on the received response condition information; and responding to the network based on a result of the determination.

12. The method of claim 11, further comprising updating the response condition information based on a response received from said one or more terminals that are qualified to respond.

13. The method of claim 12, further comprising transmitting the updated response condition information to a plurality of new terminals.

14. The method of claim 12, wherein the response condition information is updated when a total number of received responses and previously received responses is less than a threshold value, and when there are a plurality of terminals to which the response condition information is to be transmitted.

15. The method of claim 11, wherein the response condition information is differently set up for each terminal.

16. The method of claim 11, wherein the response condition information comprises identification information about a group to which a response message is to be transmitted, or identification information about one or more terminals that belong to a corresponding group.

17. The method of claim 11, wherein the response condition information comprises information required for determining to which group a terminal having received the response request message belongs, and information about whether a specific terminal is qualified to respond.

* * * * *